June 24, 1930.  C. ROCHON  1,767,154
SCREEN EXIT
Filed Oct. 7, 1929
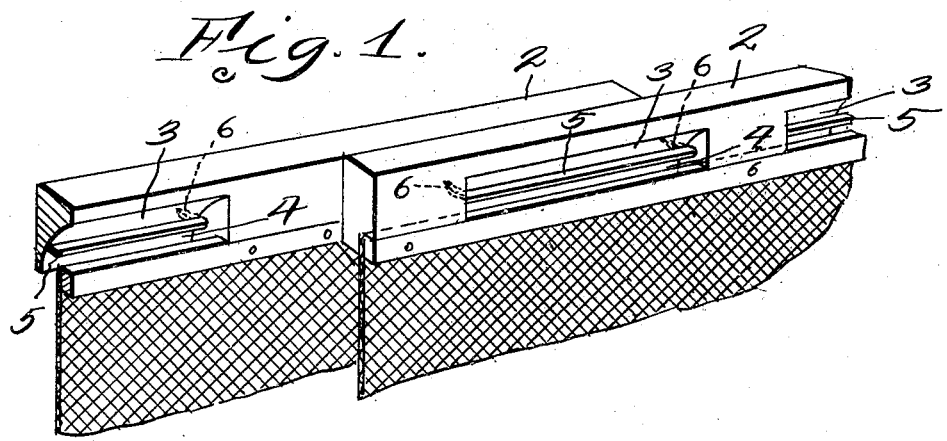
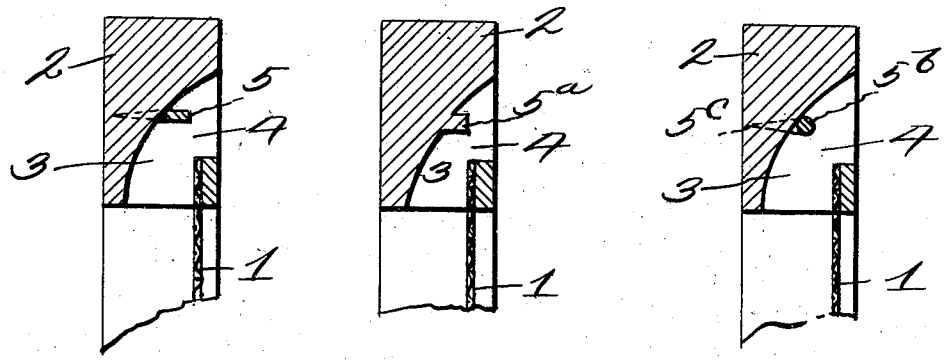
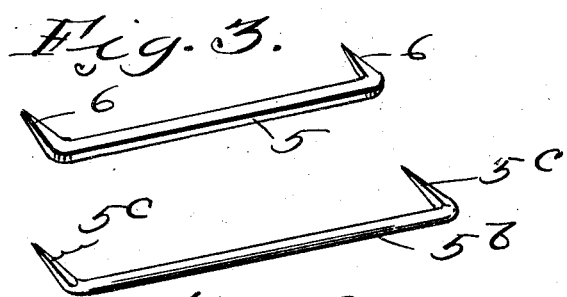
INVENTOR.
Charles Rochon
BY
ATTORNEY.

Patented June 24, 1930

1,767,154

UNITED STATES PATENT OFFICE

CHARLES ROCHON, OF FALL RIVER, MASSACHUSETTS

SCREEN EXIT

Application filed October 7, 1929. Serial No. 397,959.

The invention relates to screen exits, whereby passages are formed in the screen frame bars, particularly the upper bar, whereby flies or other insects moving upwardly on the screen will pass through the passages to the outside of the screen, and has for its object to provide transverse members in the passages above the screen as barriers for flies moving downwardly and from which barriers flies will jump across the passage, rather than continue their downward movement.

A further object is to form the barrier from an elongated member having its ends provided with angular piercing members thereby allowing the barrier to be easily and quickly applied to the exits, consequently materially reducing the cost of construction.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of portions of the upper rails of an extensible fly screen, showing the barriers applied thereto.

Figure 2 is a vertical transverse sectional view through the upper rail and through one of the exit passages.

Figure 3 is a perspective view of one of the metallic barriers.

Figure 4 is a view similar to Figure 2, but showing the barrier formed integral with the rail.

Figure 5 is a view similar to Figure 2, but showing the barrier formed from a wire member bent to form.

Figure 6 is a perspective view of the form of barrier shown in Figure 5.

Referring to the drawing, the numeral 1 designates a conventional form of extension screen, the upper bars 2 of which are provided with fly exit openings 3, which preferably curve as shown in Figures 2 to 5, and the present device is designed as an improvement on Patent No. 1,392,706, October 4, 1921 and issued to me.

It has been found that flies, when walking downwardly, will enter the exits 3 at times, however it has been found that if a ridge or barrier is placed transversely of the passage, the fly will walk over the barrier and will jump the opening 4, consequently will not pass through the passage. To accomplish this result the U-shaped barriers 5 are provided, which are preferably flattened as shown in Figures 2 and 3 and have their ends provided with prongs 6.

By forming the barrier 5 from a flattened member as shown in Figure 3, and providing the ends thereof with prongs, it will be seen that the barrier may be easily and cheaply applied within the passages 3, thereby reducing the cost of manufacture to a minimum. However if desired the barrier may be formed from an integral flange $5^a$ formed in the bottom of the passage as shown in Figure 4, or from a round material such as wire and designated by the numeral $5^b$ in Figures 5 and 6, and in which case the ends are provided with prongs $5^c$ adapted to be imbedded in the bottoms of the passages 3. The passages 3 are shown as having arcuate bottoms, and by so forming the bottoms, it is obvious the passages may be easily formed by a rotating tool or cutter, thereby insuring a further lessening of the cost of production, and by forming the barriers from staple shaped members, it is obvious they may be easily driven to position by stapling machines or by special tools, which is a material factor as screens of this particular character are sold at a relatively low price.

From the above it will be seen that a fly exit and barrier is provided for screens which is simple in construction, the parts reduced to a minimum, and one which may be cheaply manufactured and sold.

The invention having been set forth what is claimed as new and useful is:

1. The combination with a fly exit extending through the rail of a screen, said exit extending transversely over the edge of screen material, of a transverse barrier in said exit, said barrier being U-shaped, the body portion of the barrier engaging the bottom of the exit, the arms of the U-shaped barrier being sharpened, said sharpened ends being imbedded in the bottom of the exit of the rail.

2. The combination with a screen rail exit having an arcuate bottom, of a U-shaped barrier transversely disposed in the exit in engagement with the arcuate bottom thereof, the arms of said U-shaped barrier being sharpened and imbedded in the bottom of the exit.

In testimony whereof he hereunto affixes his signature.

CHARLES ROCHON.